H. HESS.
BALL BEARING.
APPLICATION FILED FEB. 28, 1906.

944,863.

Patented Dec. 28, 1909.

WITNESSES
Lilian Brock
Ella L. Corbett.

INVENTOR
Henry Hess
by Brocks Smith
Att'ys.

UNITED STATES PATENT OFFICE.

HENRY HESS, OF PHILADELPHIA, PENNSYLVANIA.

BALL-BEARING.

944,863.

Specification of Letters Patent.  Patented Dec. 28, 1909.

Application filed February 28, 1906. Serial No. 303,389.

*To all whom it may concern:*

Be it known that I, HENRY HESS, a citizen of the United States, and a resident of Philadelphia, in the county of Philadelphia and State of Pennsylvania, have invented a new and useful Ball-Bearing, of which the following is a specification.

My invention relates to ball bearings and has for a principal object the provision of a bearing which when assembled becomes a single operative unit, and as such may be handled, shipped, and placed in working position, and in which a filling opening is entirely dispensed with.

A further object is to construct a bearing of the type described so that the treads of the ball races are unbroken.

The accompanying drawing represents an exemplifying structure in which my invention is embodied.

Figure 1:
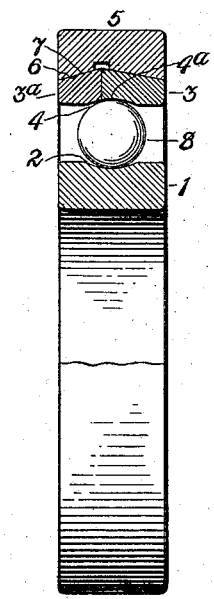
Figure 2:
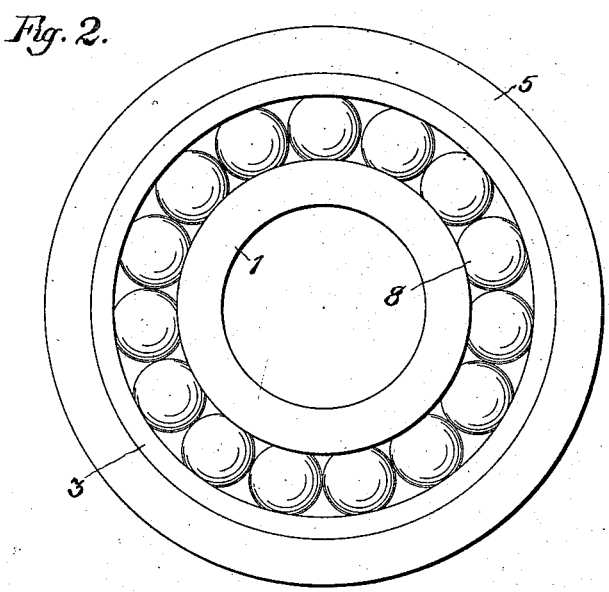

Figure 1 is a section taken on a radial plane, and Fig. 2 an end elevation.

Reference character 1 designates an inner bearing ring provided with a ball race 2. The outer bearing ring is divided and consists of the parts or members 3, 3ª. The outer bearing ring is provided with a ball race 4 formed by the juncture of race surfaces formed in the members 3, 3ª of the outer ring. The juncture of the parts of the outer ring occurs at a point to one side of the tread 4ª of the outer race giving an unbroken tread for the balls. An outer retaining ring encircles the bearing ring members 3, 3ª, which it binds together and serves in some cases to strengthen. The bearing ring members 3, 3ª are provided with outer conical surfaces 6 whose greatest diameter is at the point of juncture of the ring members and the retaining ring 5 is provided with corresponding inner conical surfaces. Balls 8 run in the races 2 and 4 between the bearing ring.

Owing to the shape of the race 4 and to the fact that no filling opening is provided, the balls 8 cannot all be readily inserted in the races in the ordinary manner. In order to assemble the bearing, therefore, the size of the outer bearing ring member 3 in relation to that of bearing ring 1 is temporarily increased, which may conveniently be done by heating bearing member 3 and chilling ring 1. This enlargement of the race ways is usually sufficient to permit the balls 8 to be inserted in the races by the use of a small amount of force. In some cases the balls may be inserted by force without resorting to the other expedients mentioned. The balls having been inserted in the races the other outer bearing ring member 3ª is put in position and the retaining ring 5, which has been temporarily sufficiently enlarged for the purpose, by heating it, for example is placed around the parts 3, 3ª of the outer bearing ring and then contracted upon them in any suitable manner, for example, by chilling. In contracting, the conical surfaces of the rings 5, 3 and 3ª serve to draw the latter very firmly together, thus insuring a proper assembled fit.

The bearing, completed as above described, forms a complete self-contained unit and as such may be shipped, handled and placed in working position without the possibility of accidental derangement. The entire absence of a filling opening prevents any possibility of injury which frequently occurs in ball bearings by reason of the balls striking the edges of such opening and crumbling the races or damaging the balls or other parts of the bearing.

What I claim is:

1. In a self-contained ball bearing, the combination of a bearing ring having a race, another bearing ring composed of two parts and having a race, the intersection of the parts of said ring being to one side of the ball contact line, and a retaining ring permanently securing the parts of the two-part ring together, the adjacent faces of the retaining ring and the two-part ring having complemental gripping surfaces.

2. In a unit-structure ball bearing, the combination of an inner bearing ring having a race, an outer bearing ring composed of two parts and having a race, the intersection of the parts of said ring being to one side of the ball contact line, and a retaining ring surrounding the outer bearing ring and permanently securing the parts of said bearing ring together, the adjacent faces of the retaining ring and the two part bearing ring being provided with complemental gripping surfaces, and balls in the races.

3. In a unit-structure ball bearing, the combination of an inner bearing ring having a race, an outer bearing ring composed of two parts and having a race, the intersection of the parts of said ring being to one side of the ball contact line, and a retaining ring surrounding the outer bearing ring and permanently securing the parts of said bearing ring together, the adjacent faces of the retaining ring and the two part bearing ring being provided with conical gripping surfaces, and balls in the races.

In testimony whereof I have affixed my signature in the presence of two witnesses.

HENRY HESS.

Witnesses:
 THEO. H. McCALLA,
 O. S. McCALLA.